P. VARGA.
WRAPPING OR LABELING MACHINE.
APPLICATION FILED NOV. 7, 1918.

1,417,956.

Patented May 30, 1922.
5 SHEETS—SHEET 1.

Witnesses:
Clarence Perdew
Helen Maier

Inventor
Paul Varga
By James N. Ramsey
Attorney.

P. VARGA.
WRAPPING OR LABELING MACHINE.
APPLICATION FILED NOV. 7, 1918.

1,417,956.

Patented May 30, 1922.
5 SHEETS—SHEET 5.

Witnesses:
Clarence Pentew
Helen Maier

Inventor
Paul Varga
By James N. Ramsey
Attorney.

UNITED STATES PATENT OFFICE.

PAUL VARGA, OF CINCINNATI, OHIO, ASSIGNOR OF ONE-HALF TO THE AROMINT MANUFACTURING COMPANY, OF CINCINNATI, OHIO, A CORPORATION OF OHIO.

WRAPPING OR LABELING MACHINE.

1,417,956.      Specification of Letters Patent.     Patented May 30, 1922.

Application filed November 7, 1918. Serial No. 261,475.

*To all whom it may concern:*

Be it known that I, PAUL VARGA, a subject of the King of Hungary, and residing at Cincinnati, in the county of Hamilton and State of Ohio, have invented certain new and useful Improvements in Wrapping or Labeling Machines, of which the following is a specification.

My invention relates to wrapping machines, and its object is the more efficient wrapping of cylindrical packages, especially such packages as have been previously wrapped and which require the application thereto of an additional wrapper or label which is to be wrapped either partially or wholly therearound but need not extend past the end of the package. The invention is more particularly concerned with wrapping or labeling in this manner the previously wrapped cylindrical packages of lozenges or the like arranged with their substantially flat sides together with the first applied wrapper crimped over the ends of the package. A machine for applying this first wrapper is disclosed and claimed in my co-pending application Serial No. 261,474, filed November 7, 1918, wherein there are some details in common with those of the present invention.

My invention consists in the combination of parts and in the details of construction and arrangement of parts as will hereinafter be more fully described and claimed.

Figures 1, 2:
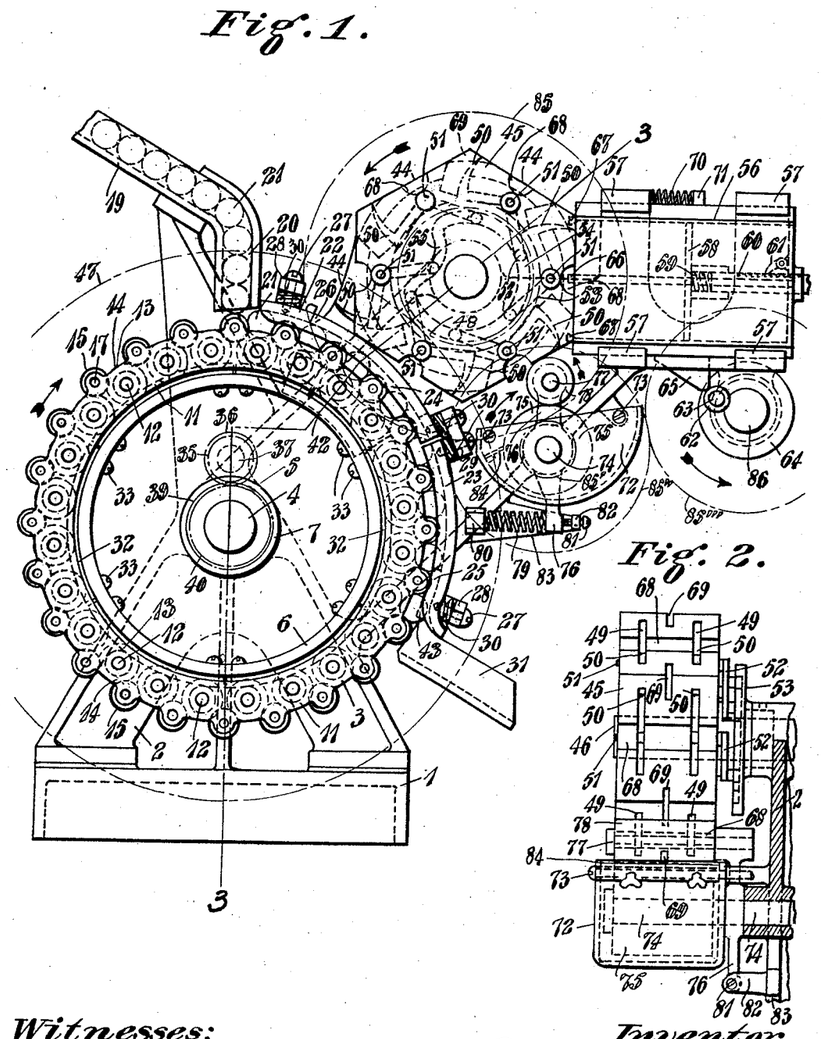
Fig. 1 is a front elevation of a wrapping or labeling machine constructed according to my invention.
Fig. 2 is a right-hand end elevation of part of the pasting and label-supply means.
Figure 3:
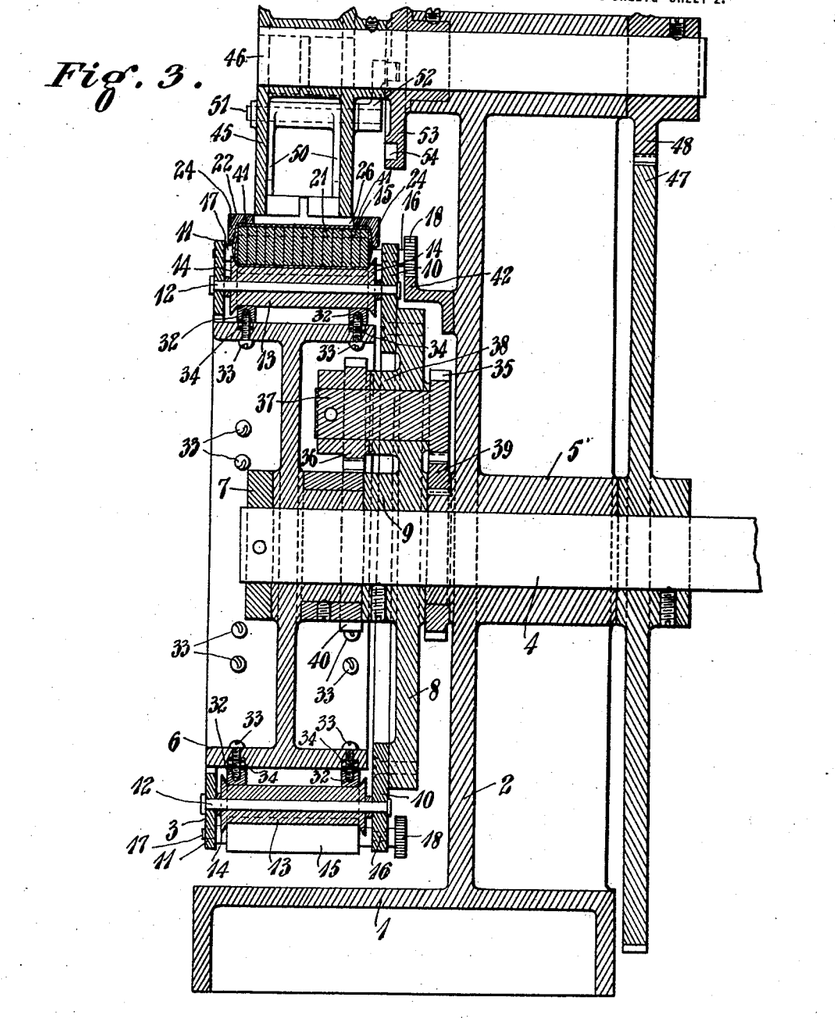
Fig. 3 is a section on planes corresponding to the line 3—3 of Fig. 1 on a somewhat enlarged scale.

As shown in Figs. 1 to 3, the base 1 has extending up from its rear part the pedestal 2. The main rotor 3 is in front of the pedestal 2 and is fixed on the driving shaft 4 that extends horizontally back through a bearing 5 in the pedestal 2. In front of the main rotor 3 is the auxiliary rotor 6 turning loosely on the forward end part of the shaft 4 and held in position by a collar 7 fixed on the shaft 4 in front of the hub of the rotor 6.

The main rotor 3 comprises the disk 8 having the hub 9 by which it is mounted on the shaft 4, as before mentioned; and a concentric framework made up of the rear ring 10 immediately to the rear of the periphery of the auxiliary rotor 6 and the front ring 11 closely surrounding said rotor 6. These rings 10 and 11 are fixed together in these relative positions by shafts 12 extending across from front to rear; and the rear ring 10 is removably secured to the disk 8. Rollers 13 having flanges 14 at their ends are journaled on their shafts 12 which are equally spaced circumferentially of the rotor 3. In the present example, these flanged rollers are placed very close together; there being twenty-four of them arranged around the rotor 3. Arranged around an outer circle are the plain rollers 15, each midway between the two adjacent rollers 13 and journaled in the rings 10 and 11 by short end shafts 16 and 17, respectively. The rear shafts 16 of these rollers extend back and have on them the gears 18 of about the same diameter as the rollers 15. The purpose of these gears will presently be described.

At the top of the machine the chute 19 inclines down from the left and preferably terminates in a short vertical part 20 which is closed on all of its four sides. This chute is of a length a little greater than the length of the cylindrical article 21 and its width is a little more than the diameter of the article. The rotor 3 and its rollers and other parts are so proportioned that this cylindrical package 21 will be received in the space above a flanged roller 13 and between the adjacent plain rollers 15 with the article bearing against all three rollers and with its ends close to the flanges 14 of the roller 13. Thus, each time one of these spaces between the three rollers passes under the lower end 20 of the chute 19, one of the articles 21 drops into the space. The main rotor 3, as here shown, is rotated from left to right or clockwise, and as it carries the enclosed article 21 from under the chute, the succeeding article 21 bears on the next plain roller 15 until the next space receives it. The feeding of the articles to the wrapping means constituted by these rollers is thus a very simple operation.

The pressing means comprises the segmental pressers or shoes 22 and 23 arranged in succession over and down to the right of the rotor 3. Each shoe or presser 22 or 23 is of inverted channel shape with the sides 24 and 25, respectively, of the channel flanking the ends of the rollers 15 passing thereunder and having the under surface substantially straight across the channel, except that in the presser 22 there is the elongated rectangular opening 26 from near its upper end to near its lower end. Near each end, each presser 22 and 23 has radial screws 27 extending through forwardly projecting brackets 28 and 29 on extensions of the pedestal 2. Between these pressers and their brackets 28 and 29 around the respective screws 27 are compressed helical springs 30. By turning the screws 27 which, by their heads, limit the inward extension of the pressers under the action of the springs 30, the positions of these pressers relative to the rotor 3 and its rollers may be nicely adjusted. The upper end of the presser 22 which is very close to the lower end 20 of the chute 19 has its flanges suitably flared so that the articles 21 readily roll under the presser as carried along by the rollers of the rotor 3; and the lower end of the presser 23 is inclined radially outward over a delivery chute 31 into which the articles 21 drop. By having the two separate pressers, each one may more accurately adjust itself to the several articles 21 rolling along under it than if the entire presser were all in one piece.

These pressers 22 and 23 are provided with their respective flanges 24 and 25 more especially for maintaining the crimping of previously wrapped packages which have had the axially extended wrapper crimped down over their ends, as disclosed in my co-pending application hereinbefore referred to. This crimping is done in the other machine by pressers similar to these, and it will be understood that any of the details therein shown may be utilized herein if desirable; these pressers being fully claimed in said co-pending application.

The auxiliary rotor 6 is in the shape of a pulley with a broad periphery around under the rollers of the main rotor 3. Mounted on this periphery are two series of segmental flanges 32; each series making up substantially a complete circle with their peripheries bearing against the lower sides of the flanged rollers 13 between the flanges 14 thereof. Each segment 32 is fastened to the rim of the rotor 6 by screws 33 passing out through the rim into the segment and having helical springs 34 around them in suitable sockets in the periphery of the rotor 6. These springs yieldably hold the segments 32 out against the rollers 13. Thus, better adjustment of these segments to these rollers is afforded in a manner similar to that of the pressers 22 and 23 with relation to the articles 21. The purpose of these segments 32 bearing against these rollers 13 is to drive these rollers 13 at approximately the speed of rotation of the article 21 as it rolls along under the pressers 22 and 23.

Since the diameter of these series of segments 32 is considerably less than the diameter of a circle through the inner surfaces of the pressers 22 and 23, it is necessary to rotate the auxiliary rotor 6 in the direction opposite to that in which the main rotor 3 is turning if the speed of rotation of these rollers 13 is to be approximated to that of the articles bearing against them. It is for this reason that this element is provided in the form of the auxiliary rotor 6 instead of the stationary element in my co-pending application hereinbefore referred to. It will also be understood that this means for equalizing the speed of rotation of the rollers 13 and the articles bearing thereon is applicable to the apparatus of said co-pending application.

For turning this auxiliary rotor 6 backwards at the required speed, any suitable geared operative connection between it and the main driving shaft 4 may be employed. An example of this herein comprises the two planetary gears 35 and 36 fixed together on a common shaft 37 which is journaled in a radially outwardly located hub 38 on the disk 8. The gear 35 is the smaller and meshes with a gear 39 fixed on a reduced extension of the bearing 5 between the rotor 8 and the pedestal 2 concentric with the shaft 4. The larger planetary gear 36 meshes with a gear 40 fixed on a reduced extension of the hub of the auxiliary rotor 6. The relative ratios of the two sets of meshing gears is such that the auxiliary rotor 6 will be turned backward just about at the right speed to give the added speed of rotation to the rollers 13 by the bearing of the segments 32 of the rotor 6 thereagainst. Thus, as shown, the diameter of the inner surfaces of the pressers 22 and 23 is to the diameter of the auxiliary rotor segments 32 as thirteen to ten. It is, therefore, necessary to give the auxiliary rotor 6 three-tenths of a revolution backward for each revolution of the main rotor 3 forward. For effecting this, the planetary gear 35 is made one-half the diameter of the fixed gear 39 and the planetary gear 36 is made sixty-five hundredths of the diameter of the gear 40 on the auxiliary rotor 6. This results in turning the planetary gears twice at each revolution of the main rotor 3 which has the tendency to turn the auxiliary rotor 6 two times sixty-five hundredths or one and three-tenths revolutions backward. But at the same time these planetary gears are carried around the auxiliary rotor 6 one revolution forward; so that the actual backward rotation of the auxiliary rotor 6 is this rotation it would tend to have minus this one complete revolution of the planetary gears, or one and three-tenths minus one which equals the required three-tenths of a revolution. This arrangement of the gearing has the advantage of compactness and simplicity. It will be understood, however, that any means for equalizing the speeds of rotation of the rollers 13 and the articles comes equally within the domain of my invention.

As the machine is here designed, the wrappers or labels to be applied to these cylindrical articles 21 are not as wide as the length of the articles; and it is the purpose to feed these labels down through the rectangular opening 26 in the presser 22; this opening being made just a little wider than the labels. This leaves only comparatively narrow bearings 41 between the presser 22 and the article 21 near the ends of the article, as best seen in Fig. 3. Such reduced bearing is not favorable to uniform rotation of the article. To compensate for this in this region of the travel under the presser, I provide the fixed segment rack 42 extending forward from the pedestal 2 and of about the same angular extent as the rectangular opening 26; this rack meshing with the gears 18 of the plain rollers 15, on the radially inward sides of the gears 18, and thus positively rotating these rollers at about the speed which the article 21 should have were it efficiently engaged by the presser in this region. Also, near the lower end of the presser 23, another segment rack 43 is fixed to mesh with these gears 18 on their radially outward sides so as to begin to rotate them backwards just as the articles are becoming disengaged from the presser 23. This results in positively throwing the articles out from between the rollers into the chute 31.

With this provision for feeding the articles to the wrapping means and approximately uniformly rotating them under the pressers, it is the purpose to feed a label 44 between each article 21 and the plain roller 15 bearing against the article at the rear thereof; whereupon the label is drawn down between the article 21 and roller 15 and around between the article and the supporting roller 13, and then up between the article and the roller 15 lying in front of the article and then between the article and the lower surface of the presser and from there around under the other end of the label which, by continued rolling, is lapped over the first end. In order to secure the label thus wrapped around the article, it is necessary to supply paste to the under side thereof at the proper places.

As shown in Figs. 1 to 3, a hexagonal label carrier 45 is fixed on the shaft 46 which is parallel to the main driving shaft 4 of the rotors, so that the six sides of the carrier 45 may successively swing around past the rectangular opening 26 in the presser 22; the angles between these sides dipping slightly into this opening, as here shown. This shaft 46 is journaled in an upward extension of the pedestal 2 and is driven through the medium of a large gear 47 fixed on the driving shaft 4 at the rear of the pedestal 2 and a pinion 48 fixed on said shaft 46 at the rear of the upward extension of the pedestal 2. The rotor being adapted to receive twenty-four articles in a complete revolution, and the carrier 45 being adapted to deliver one label from each of its six sides, the large gear 47 is made four times the diameter of the pinion 48.

This carrier 45 has a pair of slots 49 in each one of its six sides (Fig. 2) in which are pivoted hook-shaped fingers 50 on small shafts 51 parallel with the axis of the carrier and extending out to the rear thereof, with cranks 52 having their wrists bearing in the slot of a cam 53 that is fixed to the pedestal extension around the shaft 46. These fingers 50 and their arms 52 are so relatively arranged on their shafts 51 that as long as the wrists of the cranks 52 travel in the concentric part 54 of the cam groove, the pointed ends of the fingers are held inside the carrier 45; but when these wrists reach an abruptly radially inwardly curving part 55 of the cam groove, the pointed ends of the fingers are thrown out through the slots 49. The cam 53 has this inwardly curved part 55 of its groove in such a position that the finger end is thrown out through a respective side of the carrier 45 just as this side advances its lower edge closely to the upper end of the rectangular opening 26.

To the right of the carrier 45, the label holder 56 is mounted to slide horizontally in suitable upper and lower bearings 57 on the upward extension of the pedestal 2. This holder 56 is of rectangular box-like formation with the labels standing vertically therein from left to right, so that the exposed label at the left open end of the box comes against an approaching side of the carrier 45. The mass of labels is held to the left by a follower 58 with a spring 59 compressed between it and a ratchet plunger 60 which extends through the right-hand closed end of the holder 56 and is engaged by a pawl 61 pivoted on the inner side of the holder end to drop down into the teeth on the upper side of the ratchet. This holder 56 slides to the right in its bearings 57 as each corner of the hexagonal carrier 45 passes its left-hand end and then as the side of the carrier becomes alined with the exposed label, the holder is pushed to the left by the engagement of a roller 62 carried around on the wrist 63 on a disk 64 against a downward extension 65 on the bottom of the holder 56.

The holder 56 has at the middle of each one of the four sides of its open left-hand end short fixed fingers 66 and 67 which temporarily hold the exposed label until it is properly contacted by the flat side of the carrier 45. The carrier has the concavities 68 in its sides to pass the fingers 66 and has the slots 69 in its angles which swing over the fingers 67 to permit these angles to pass the fingers without interferring with the close approach of the holder 56. A helical spring 70 compressed between the upper left-hand bearing bracket 57 and a lug 71 on the holder 56 may push the holder 56 away from the carrier 45 at each passage of an angle of the carrier; or this spring may be dispensed with and the holder be pushed over by the impact of the carrier. The labels are advanced in the holder by virtue of their momentum and that of the follower and attached parts each time the holder 56 is pushed to the left by the disk 64, as before described; the pawl 61 serving to maintain his advanced position each time the holder 56 moves to the right.

Below the carrier and holder is the paste or glue reservoir 72 fixed on the pedestal extension by means of studs 73. A shaft 74 has a bearing in the pedestal extension and extends through the adjacent side of the reservoir 72 with a supply roller 75 fixed on it inside the reservoir. Between the reservoir and the bearing, an arm 76 is pivoted on this shaft and carries at its upper end a forwardly projecting stud 77 on which turns loosely the pasting roller 78 in contact with the supply roller 75. The arm 76 extends down and has a helical spring 79 compressed between it and a lug 80 on the pedestal extension at the left. A set-screw 81 passes through a lug 82 at the right of this arm 76 on a bracket 83 extending from the pedestal extension. This spring 79 thus yieldably holds the pasting roller 78 up against the label carrier 45; each side of the carrier coming into contact with this pasting roller 78 just before it passes around the exposed label in the holder 56. The pasting roller thus being yieldable, it is held firmly against the carrier side. The set-screw 81 serves to limit the inward projection of the pasting roller 78 which may thus be adjusted at any time. The reservoir 72 preferably has at its rear a scraper 84 bearing against the supply roller 75 to prevent the carrying of any excess paste or glue to the pasting roller 78 and consequently to the carrier side. The supply roller 75 is positively driven by a gear 85 on the carrier shaft 46 meshing with a gear 85' on the shaft 74, and drives the disk 64 by a gear 85'' meshing with the gear 85''' on the shaft 86 with the disk 64, as shown by the broken lines in Fig. 1.

Each side of the carrier 45 thus having paste applied to it and next coming into intimate contact with the exposed lower side of the label or wrapper at the left-hand end of the holder 56, the label or wrapper which adheres to the side is carried up and over and down to the left. Then the respective finger 50 which had been withdrawn inside the carrier has its pointed end projected against the adjacent lower side of the label, forcing the lower end of the label out (Fig. 1) to enter the rectangular opening 26 of the presser 22 close to its upper end and there pass between the article and the rollers, as previously described. The label having carried with it most of the paste or glue by which it had adhered to the carrier side, is now pasted to the article 21 and the overlapped ends of the label pasted together by the rolling operation under the pressers, as before described; to be finally ejected by the action of the rack 43 on the gear 18, as before described.

Figures 4, 5:
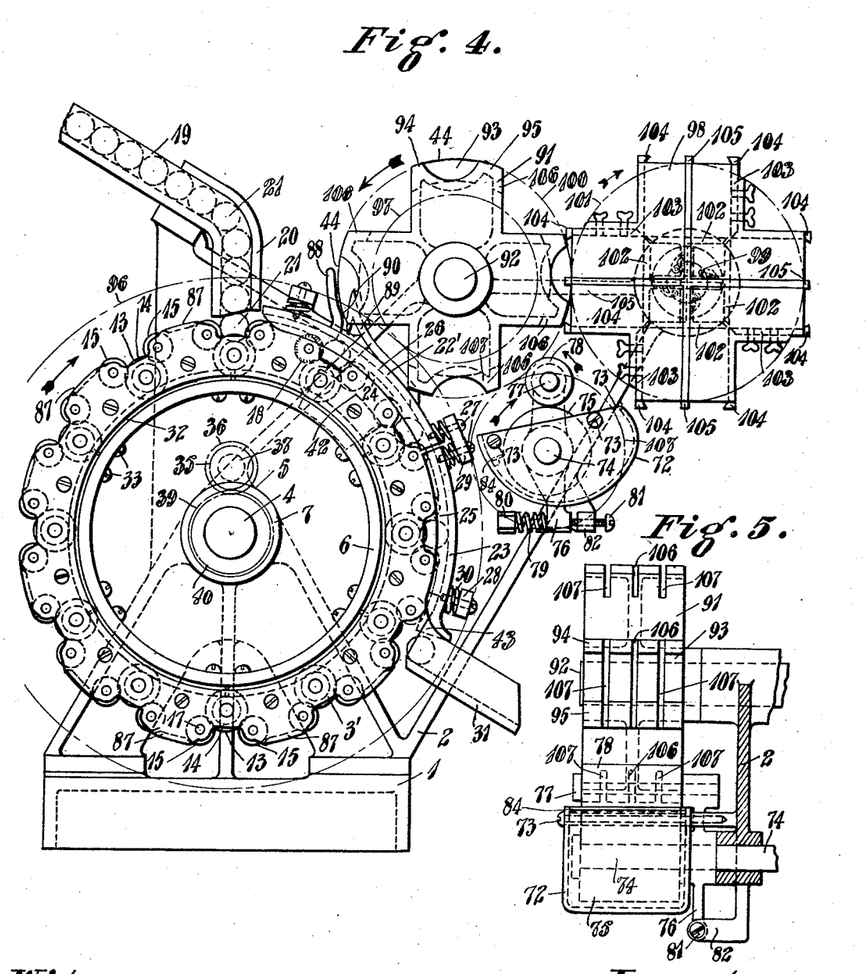
Fig. 4 is a front view similar to Fig. 1, showing a modification of the machine.
Fig. 5 is an end view similar to Fig. 2 showing the modified pasting and label-supply means.

In the modification shown in Figs. 4 and 5, the auxiliary rotor 6 and its operative mechanism are the same as in the preceding example and the main rotor 3' is similar except that it has only twelve of the flanged rollers 13 each having associated with it at opposite sides two plain rollers 15. There is thus a distinct set of three rollers each making up a wrapping means, and between the sets the rotor 3' has the segmental bridge pieces 87 with their outer surfaces conforming to a circle tangent to the rollers 15 at their outermost sides and coming very close to the surfaces of these rollers.

Thus upon rotation of the rotor 3', the articles 21 will be fed from the lower end 20 of the chute 19 into the spaces between the rollers 15 over the rollers 13, but will ride on the bridge pieces 87 between the sets of rollers. Therefore, the rotor will take only twelve articles at each revolution. The arrangement and operation of the pressers 22' and 23 are substantially the same as in the preceding example. In this example, however, only the following roller 15 of each set is provided with the gear 18, as shown by the dotted lines in Fig. 4, to mesh with the segments 42 and 43. The upper presser 22' differs in that it has an elongated upward extension 88 at the upper end of its rectangular opening 26 and narrow detaching fingers 89 extend along its opening 26 and present pointed ends 90 upward just to the right of the extension 88 with sides converging toward the extension 88 downward. These provisions are in accordance with the different wrapper or label-supply means employed in the present example.

The label carrier 91 is here made up of four arms, having their outer ends conforming to a circle concentric with the shaft 92 of the carrier which is journaled in the upward extension of the pedestal parallel to the main driving shaft 4. The end of each arm, however, has the concavity 93 somewhat offset from its middle in the direction of rotation of the carrier, so that the advanced part 94 is considerably narrower than the following part 95 on each end of the arm which thus makes up a side of this modified carrier. The carrier is rotated to the left or counter-clockwise by a gear 96 on the main shaft 4 meshing with the gear 97 on the carrier shaft 92.

The label holder 98 comprises four hollow arms radiating from a hub in which is fixed the shaft 99 journaled in the pedestal extension parallel to the carrier shaft 92 and rotated to the right by a gear 100 on the carrier shaft 92 meshing with a gear 101 on the holder shaft 99. It will be understood that this hub and shaft are completely at the rear of the holder, leaving the center of the holder containing the four followers 102 for the respective hollow arms which contain the labels 44. Each hollow arm preferably has one of its sides 103 adjustable transversely to provide for labels of slightly varying dimensions. The labels are advanced in each one of the arms as the arm swings downward just previously to advancing into alinement with one of the arms of the carrier 91. Each arm has, at each one of its four sides, slightly projecting fixed fingers 104 and 105 to hold the exposed labels pending their contact with the end parts 94 and 95 of the carrier. Each one of the arms of the carrier 91 has three circumferential slots 106, the middle ones to swing past the upper and lower fingers 104 of the holder while the lateral fingers 105 come within the concavity 93 of the respective end. Each one of these circumferential slots 106 swings over one of the fingers 89 on the presser 22'.

The pasting or gluing means is driven by a gear 107 meshing with the gear 100, and is substantially the same as that of the preceding example; the pasting roller 78 making yieldable contact with the parts 94 and 95 of each arm just before they pass up into contact with the exposed label in a respective arm of the holder 98. These parts 94 and 95 thus having paste on them, the label adheres to them and is carried around until its under side comes into contact with the adjacent sides of the fingers 89, which fingers are admitted under the label through the slots 106, as just described. This causes the label to be detached from the parts 94 and 95 and to pass down between the article 21 and the adjacent roller 15 which is now being positively driven by the meshing of its gear 18 with the rack 42. The subsequent treatment of the article and label under the pressers is as in the preceding example.

Figure 6:
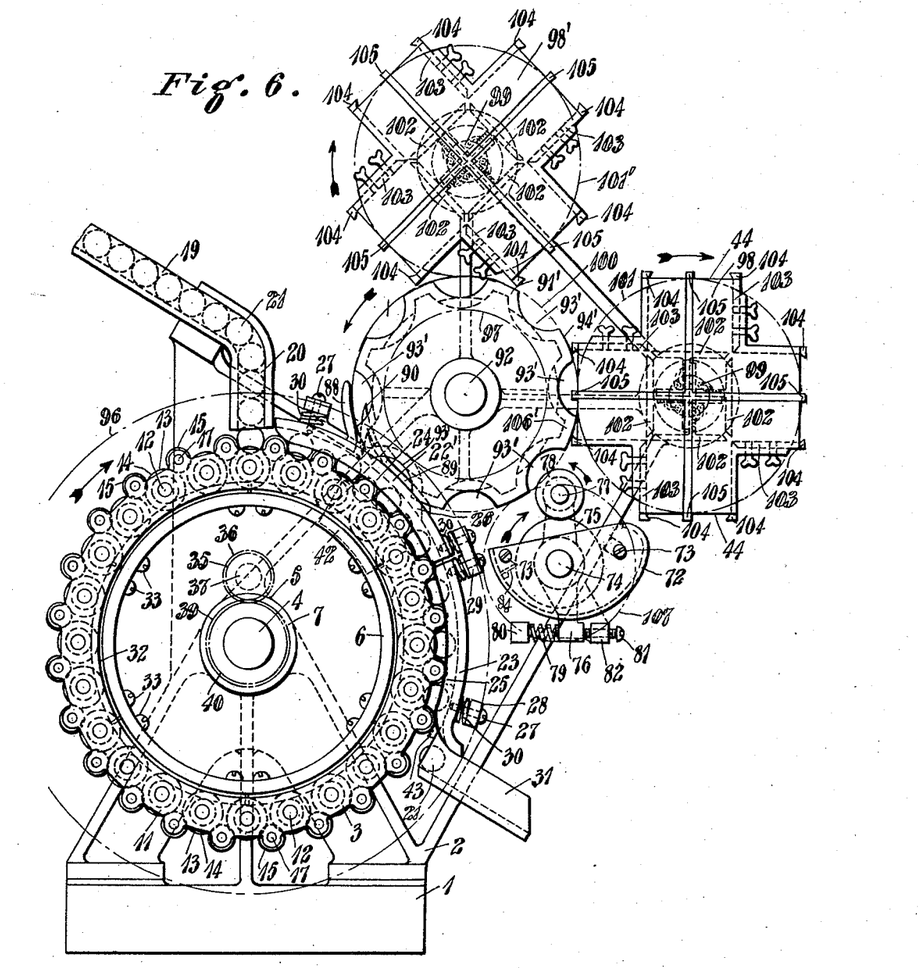
Fig. 6 is a front view similar to Figs. 1 and 4, but showing another modification of the machine.

In the example of Fig. 6, the rotor 3 is as in Fig. 1, having spaces for twenty-four articles at each revolution; and the pressing and roller-actuating means, including the auxiliary rotor 6, being as in Fig. 1. The label carrier 91', however, is here more completely circular and is provided with eight of the concavities 93' defining peripheral spaces 94' with slots 106' in such a manner that the parts of spaces adjacent to a concavity 93' act as one of eight sides of the carrier. The pasting or gluing means is the same as in Figs. 4 and 5. Also, the label holder 98 at the right of the carrier 91' is the same as in Fig. 4. But this label holder is adapted, with its four arms, to supply labels only to alternate ones of the sides of the carrier 91'. Therefore, to supply labels to the other alternate sides, a similar label holder 98, is mounted directly above the carrier 91' and has its gear 101' also meshing with the gear 100 of the carrier; this holder being forty-five degrees in advance of the other one. By this means the carrier 91 is enabled to deliver twenty-four labels to the rotor 3 at each revolution of the rotor, as is required.

Figure 7:
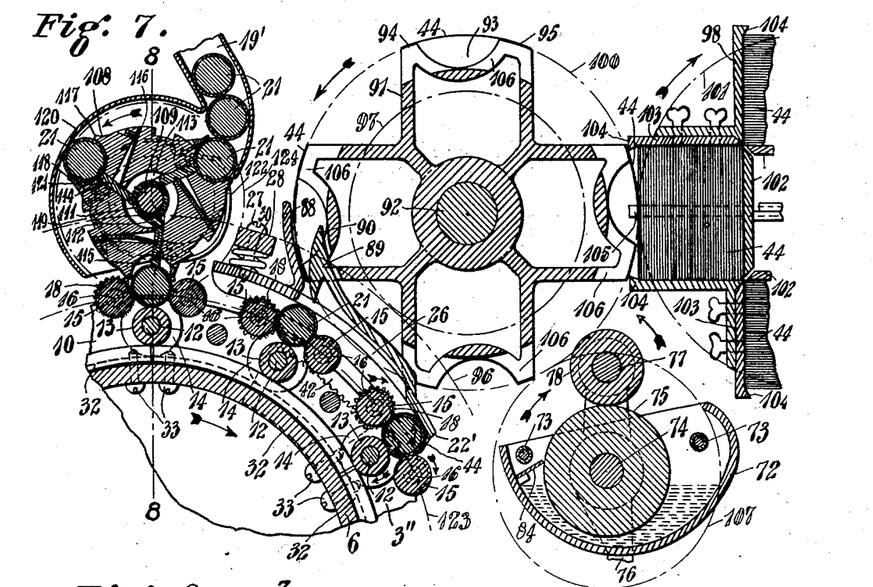
Fig. 7 is a partial vertical longitudinal section on a plane corresponding to the line 7—7 of Fig. 8 showing a modified feeding means.
Figure 8:
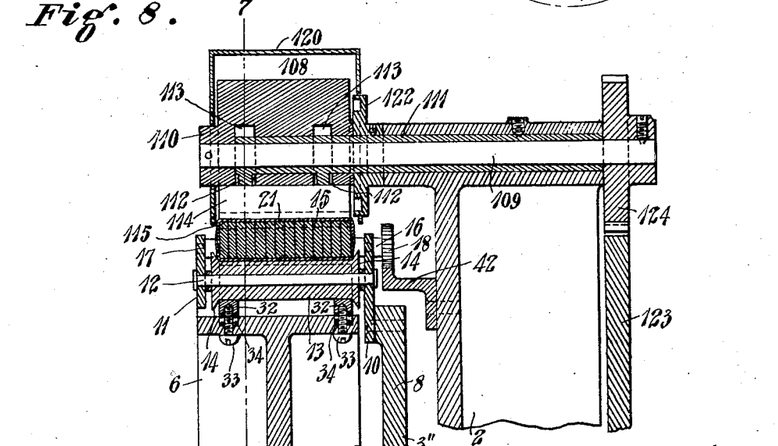
Fig. 8 is a partial vertical cross section on a plane corresponding to the line 8—8 of Fig. 7.

In the modification of Figs. 7 and 8, the rotor 3" is like that of Fig. 4 in that it has only twelve rollers 13, each with two associated rollers 15; but the bridge pieces 87 are omitted. The label-supply and pasting means are also as shown in Fig. 4; the carrier delivering only twelve labels at each revolution of the rotor 3". The pressers and the roller-actuating means are as in the preceding examples.

Instead of the simple chute 19 with its upright end 20, however, there is a feeding head 108 which is fixed to a central shaft 109 by a front hub 110 (Fig. 8); the shaft 109 projecting back through a long sleeve 111 which enters the head 108 around the shaft 109, and has downwardly projecting cam lugs 112 occupying annular recesses 113 in the head 108 near opposite ends thereof. The broad flat plungers 114 lie in slots in the head 108 that extend from the recesses 113 out to concavities 115 in the periphery of the head 108. As shown, there are three of these concavities 115 and corresponding plungers 114. Flat springs 116 are fixed in the head and normally hold these plungers radially inward, but permit them to be pressed radially outward when their inner ends are engaged by the cam lugs 112 on the fixed sleeve 111 as the plungers are carried around past these lugs by the rotation of the head 108. The surface of the head 108 between these concavities is preferably eccentric; being inclined outward from left to right from each concavity around to the next one and terminating in a projection 117 adjacent to the concavity. This feeding head 108 is designed to be rotated counter-clockwise, and this projection 117 is on the following side of the concavity. At the advanced sides are provided respective fingers 118 each adapted to swing up alongside the cavity or to swing over into a peripheral recess 119. The upper and left-hand sides of the head 108 are enclosed by a shell 120 concentric with the axis of rotation of the head and spaced far enough out therefrom that one of the articles 21 lying in a concavity 115 may be carried freely around. At the upper right-hand end of this shell is the lower end of the chute 19' from which the cylindrical articles 21 successively pass to enter the concavities 115 as they pass under this lower end of the chute; the right-hand side of the chute being carried down so that the projections 117 of the head just clear it. The finger 118 has to the rear of the head and fixed to its pivot a small arm 121 which bears in the side slot of a cam 122 fixed around the sleeve 111. The left-hand part of this cam is concentric with the shaft 109; but its right-hand part is projected in such a way that the arms 121 ride up on it and throw the fingers 118 over into the recesses 119 so that they may pass under the lowermost article 21 resting on the periphery of the head. Then as soon as the article has been received in the respective concavity 115, the arm 121 of the respective fingers 118 rides down and permits the finger to rise against the article 21 and hold it in the concavity while it is carried around and down into the space between the rollers 13 and 15. The article is then ejected from the concavity 115 by the plunger 114 actuated by the fixed cam lugs 112. The subsequent operations are as in the preceding examples. It will be understood that this feeding mechanism is also applicable to wrapping machines such as that disclosed and claimed in my hereinbefore referred to co-pending application. It is driven through gears 123 and 124.

While certain constructional details are deemed preferable in connection with my invention, and I have shown and described these rather specifically in elucidating the construction and use of my invention, as is required, I do not wish to be understood as being limited to such precise showing and description. As specifically shown herein, my invention is particularly adapted for applying a wrapper which simply passes entirely around the cylindrical package with the ends of the wrapper overlapping and pasted together. Though this wrapper as applied in practice principally functions as a label, it nevertheless performs the function of an additional wrapper serving to hold more securely the first applied wrapper. However, shorter wrappers or labels may be applied to the cylindrical packages extending only part of the way around the package without any departure from the principle of the invention as set forth herein. If such shorter labels or wrappers are properly provided with adhesive near their ends they will be attached to the packages during the rolling operation under the pressers. It will be understood, therefore, that the words "wrapper" and "label" are used interchangeably herein.

While several examples of means for supplying the wrappers or labels and carrying them to the wrapping means are shown, it will be seen that they are all similar in that the carrier in each instance is multilateral and adapted to receive a single detached label or wrapper on each of its sides and to deliver these wrappers or labels from said sides to the wrapping means. Likewise, it will be understood that the principle of construction and operation of the several examples of wrapping means remains the same throughout; and also that while the stationary presser is shown in coaction with the traveling wrapping means, any means in conjunction with the wrapping means, whether stationary or traveling with it, may be comprehended in my invention so long as it serves to cause the wrapping means to either wholly or partially wind or wrap the wrapper or label around the package during the rotation of the package by the wrapping means.

Other variations from the specific examples contained herein will be encountered in practice, and, therefore, having thus fully described certain examples of my invention, what I claim as new and desire to secure by Letters Patent is:

1. In a wrapping or labeling machine, traveling wrapping means to rotatably support an article to be wrapped, movable means coacting with said wrapping means during travel thereof to actuate said wrapping means and cause rotation of said movable means moving in a direction different from that of the travel of said wrapping means, means for feeding said article to said wrapping means, and means for supplying a wrapper or label between said article and said wrapping means.

2. In a wrapping or labeling machine, traveling wrapping means to rotatably support an article to be wrapped, movable means coacting with said wrapping means during travel thereof to actuate said wrapping means and cause rotation of said article, said movable means moving in a direction different from that of the travel of said wrapping means, means to press said article to said wrapping means during said rotation, means for feeding said article to said wrapping means, and means for supplying a wrapper or label between said article and said wrapping means.

3. In a wrapping or labeling machine, traveling wrapping means comprising a supporting roller and flanking rollers to rotatably support a wrapped article having a crimped end, a flange on said supporting roller to maintain the crimp of said end, movable means coacting with said supporting roller during travel thereof to cause rotation of said article, means for feeding said article to said wrapping means, and means for supplying a wrapper or label between said article and said wrapping means.

4. In a wrapping or labeling machine, traveling wrapping means to rotatably support a wrapped article having a crimped end, means to press said article to said wrapping means during rotation of said article, comprising longitudinal means juxtaposed to said crimped end in a direction therefrom parallel to the axis of said rotation, to maintain the crimp of said end, movable means coacting with said wrapping means during travel thereof to actuate said wrapping means and cause rotation of said article, means for feeding said article to said wrapping means, and means for supplying a wrapper or label between said article and said wrapping means.

5. In a wrapping or labeling machine, traveling wrapping means to rotatably support a wrapped article having a crimped end, means to press said article to said wrapping means during rotation of said article, comprising a longitudinal flange having a side which inclines increasingly in the direction of travel of said wrapping means, said side being juxtaposed to said crimped end in a direction therefrom parallel to the axis of said rotation, to maintain the crimp of said end, means for feeding said wrapped article to said wrapping means, and means for supplying an additional wrapper or label between said wrapped article and said wrapping means.

6. In a wrapping or labeling machine, traveling wrapping means comprising a supporting roller and flanking rollers to rotatably support an article to be wrapped, movable means coacting with said supporting roller to cause rotation of said article, means for feeding said article to said wrapping means, and means for supplying a wrapper or label between said article and said wrapping means.

7. In a wrapping or labeling machine, traveling wrapping means comprising a supporting roller and flanking rollers to rotatably support an article to be wrapped, movable means coacting with said supporting roller to cause rotation of said article, said movable means moving in a direction different from that of the travel of said wrapping means, means for feeding said article to said wrapping means, and means for supplying a wrapper or label between said article and said wrapping means.

8. In a wrapping or labeling machine, a rotor, a series of wrapping means arranged around the periphery of said rotor, each one of said wrapping means comprising a supporting roller and flanking rollers to rotatably support an article to be wrapped, movable means coacting with the supporting rollers of said wrapping means, as they are carried around on said rotor to cause rotation of the articles, means for feeding articles to said wrapping means, and means for supplying wrappers between said articles and said wrapping means.

9. In a wrapping or labeling machine, a rotor, a series of wrapping means arranged around the periphery of said rotor, each one of said wrapping means being adapted to rotatably support an article to be wrapped, movable means coacting with said wrapping means as they are carried around on said rotor to actuate said wrapping means and cause rotation of the articles, said movable means moving in a direction different from that of the travel of said wrapping means, means for feeding said articles to said wrapping means, and means for supplying wrappers or labels between said articles and said wrapping means.

10. In a wrapping or labeling machine, a main rotor, a series of wrapping means arranged around the periphery of said main rotor, each one of said wrapping means being adapted to rotatably support an article to be wrapped, an auxiliary rotor within said main rotor in operative contact with said wrapping means as they are carried around on said main rotor, means to rotate said rotors in opposite directions to actuate said wrapping means and cause rotation of the articles, means for feeding said articles to said wrapping means, and means for supplying wrappers or labels between said articles and said wrapping means.

11. In a wrapping or labeling machine, a main rotor and an auxiliary rotor coaxially mounted, a series of wrapping means arranged around the periphery of said main rotor in operative contact with said auxiliary rotor, each one of said wrapping means being adapted to rotatably support an article to be wrapped, a gear fixed adjacent to and concentric with said rotors, a gear fixed to and coaxial with said auxiliary rotor, planetary gears coaxially fixed together and rotatably mounted on said main rotor and meshing with respective ones of the aforesaid gears, whereby said rotors are rotated in opposite directions to actuate said wrapping means and cause rotation of the articles, means for feeding said articles to said wrapping means, and means for supplying wrappers or labels between said articles and said wrapping means.

12. In a wrapping or labeling machine, traveling wrapping means to rotatably support an article to be wrapped, means for feeding said article to said wrapping means, means for supplying a wrapper or label between said article and said wrapping means, and means yieldably contacting with part of said wrapping means to cause said wrapping means to rotate said article.

13. In a wrapping or labeling machine, a main rotor, a series of wrapping means arranged around the periphery of said rotor, each one of said wrapping means being adapted to rotatably support an article to be wrapped, an auxiliary rotor within said main rotor, segments yieldably mounted on the periphery of said auxiliary rotor in an annular series therearound and making contact with said wrapping means, means for rotating said rotors in opposite directions whereby said wrapping means is actuated by said contact to cause rotation of the articles, means for feeding said articles to said wrapping means, and means for supplying wrappers or labels between said articles and said wrapping means.

14. In a wrapping or labeling machine, a rotor, a series of wrapping means arranged around the periphery of said rotor, each one of said wrapping means being adapted to rotatably support an article to be wrapped, a presser pressing radially inward against the articles when supported by said wrapping means, means coacting with said wrapping means radially inward a considerable distance from said presser, means for equalizing the operative effect of this coacting means and said presser upon said articles, means for feeding said articles to said wrapping means, and means for supplying wrappers or labels between said articles and said wrapping means.

15. In a wrapping or labeling machine, a rotor, a series of wrapping means arranged around the periphery of said rotor, each one of said wrapping means being adapted to rotatably support an article to be wrapped, a presser pressing radially inward against the articles when supported by said wrapping means, means coacting with said wrapping means radially inward a considerable distance from said presser, means for equalizing the operative effect of this coacting means and said presser upon said articles, a yieldable mounting for said pressing means, and a yieldable mounting for said coacting means, means for feeding said articles to said wrapping means, and means for supplying wrappers or labels between said articles and said wrapping means.

16. In a wrapping or labeling machine, traveling wrapping means comprising an elongated supporting roller and elongated flanking rollers on parallel axes substantially at right angles to the path of travel, and adapted to receive a cylindrical article between said flanking rollers and upon said supporting roller, pressing means bearing on said article when supported by said rollers, a gear fixed to one of said flanking rollers coaxially therewith, a rack with with which said gear meshes and relatively to which said wrapping means travels, means for feeding said article to said wrapping means, and means for supplying a wrapper or label between said article and said wrapping means.

17. In a wrapping or labeling machine, traveling wrapping means comprising an elongated supporting roller and elongated flanking rollers on parallel axes substantially at right angles to the path of travel, and adapted to receive a cylindrical article between said flanking rollers and upon said supporting roller, pressing means bearing on said article when supported by said rollers, and having a middle opening to admit a wrapper or label to said rollers and article, leaving only narrow bearings of said presser on said article at opposite sides of said opening, means for positively rotating one of said flanking rollers as it passes said opening, means for feeding said article to said wrapping means, and means for supplying a wrapper or label through said opening in said presser to pass between said article and said wrapping means.

18. In a wrapping or labeling machine, traveling wrapping means comprising an elongated supporting roller and elongated flanking rollers on parallel axes substantially at right angles to the path of travel, and adapted to receive a cylindrical article between said flanking rollers and upon said supporting roller, pressing means bearing on said article when supported by said rollers, a gear fixed coaxially to one of said flanking rollers, a rack at the end of said pressing means where said wrapping means passes from under said pressing means, said wrapping means being movable relatively to said rack, and said gear meshing with said rack whereby it is rotated to discharge said article from between said rollers as it emerges from under said pressing means, means for feeding said article to said wrapping means, and means for supplying a wrapper or label between said article and said wrapping means.

19. In a wrapping or labeling machine, traveling wrapping means comprising an elongated supporting roller and elongated flanking rollers on parallel axes substantially at right angles to the path of travel, and adapted to receive a cylindrical article between said flanking rollers and upon said supporting roller, pressing means bearing on said article when supported by said rollers, and having an opening to admit a wrapper or label to said article and said wrapping means, a gear fixed coaxially to one of said flanking rollers, a rack substantially coextensive with said opening along the path of travel of said wrapping means, another rack near the end of said pressing means where said wrapping means emerges from under said pressing means, said wrapping means being movable relatively to said racks, and said gear meshing with the first-mentioned rack to assist in the rotation of said article by said pressing means, and said gear meshing with the second rack to rotate said article in the opposite direction and discharge it from between said rollers and said pressing means, means for feeding said article to said wrapping means, and means for supplying a wrapper or label between said article and said wrapping means.

20. In a wrapping or labeling machine, traveling wrapping means supporting and rotating an article to be wrapped, means to feed said article to said wrapping means, a holder to hold a supply of wrappers or labels, a carrier having a part traveling from said holder to a part of the path of said wrapping means wherein said article is rotated, means whereby said part of said carrier draws a wrapper or label from said holder, and means whereby said wrapper or label is released from said part and caused to be inserted by said carrier between said rotating article and said traveling wrapping means.

21. In a wrapping or labeling machine, traveling wrapping means supporting and rotating an article to be wrapped, means to feed said article to said wrapping means, a presser to press said article to said wrapping means, having an opening, a holder to hold a supply of wrappers or labels, a carrier having a part traveling from said holder to a part of the path of said wrapping means wherein said article is rotated, means whereby said part of said carrier draws a wrapper or label from said holder, and means whereby said wrapper or label is released from said part and caused to be inserted by said carrier through said opening in said presser between said rotating article and said traveling wrapping means.

22. In a wrapping or labeling machine, traveling wrapping means supporting and rotating an article to be wrapped, means to feed said article to said wrapping means, a holder to hold a supply of wrappers or labels, a carrier having a part traveling from said holder to a part of the path of said wrapping means wherein said article is rotated, means for applying an adhesive to said carrier before it reaches said holder, whereby a wrapper or label adheres to said carrier and is drawn from said holder, and means detaching said wrapper or label from said carrier whereby said carrier inserts said wrapper or label between said rotating article and said traveling wrapping means.

23. In a wrapping or labeling machine, a rotary multilateral carrier, a series of wrapping means successively passing said carrier each supporting and rotating an article to be wrapped, while thus passing, a holder to hold a supply of wrappers, approached by the sides of said carrier before said sides approach said passing wrapping means and rotating articles, means for applying an adhesive to said sides before they approach said holder, whereby wrappers or labels adhere to respective ones of said sides and are withdrawn from said holder, means detaching said wrappers or labels from said sides whereby said carrier inserts said wrappers or labels between respective ones of said wrapping means and rotating articles as they pass said carrier, and means for feeding said articles to said wrapping means before they reach said carrier.

24. In a wrapping or labeling machine, a rotor, a series of wrapping means arranged around the periphery of said rotor, a multilateral carrier adjacent to the periphery of said rotor, rotating on an axis parallel to that of said rotor, means to rotate said rotor and carrier in opposite directions, means to apply adhesive to the sides of said rotor, means to supply wrappers or labels to said sides after said adhesive is applied thereto, whereby said wrappers or labels adhere to said sides and are carried around adjacent to respective wrapping means, means detaching said wrappers or labels from said sides whereby said carrier inserts said wrappers into respective ones of said wrapping means as they pass said carrier, and means for feeding articles to said wrapping means before they reach said carrier.

25. In a wrapping or labeling machine, traveling wrapping means to receive and wrap an article by rotating said article, a chute to successively supply said articles adjacent to said wrapping means at one stage of the travel of said wrapping means, a rotatable element at the lower end of said chute adjacent to said wrapping means, said element having a concavity in its periphery and having a hollow interior and a slot from said interior to said concavity, a plunger in said slot, a fixed cam in said interior with which said plunger engages to be protruded into said concavity as it passes said wrapping means, said concavity receiving articles from said chute and carrying them around to be ejected into said wrapping means by said plunger, means to rotate said element simultaneously with the travel of said wrapping means, means for supplying a wrapper or label between said article and said wrapping means, and means to press said article and said wrapper or label together in said wrapping means during subsequent travel thereof.

26. In a wrapping or labeling machine, traveling wrapping means to receive and wrap an article by rotating said article, a chute to successively supply said articles adjacent to said wrapping means at one stage of the travel of said wrapping means, a rotatable element at the lower end of said chute adjacent to said wrapping means, said element having a concavity in its periphery and having a hollow interior and a slot from said interior to said concavity, a plunger in said slot, a fixed cam in said interior with which said plunger engages to be protruded into said concavity as it passes said wrapping means, said concavity receiving articles from said chute and carrying them around to be ejected into said wrapping means by said plunger, a finger pivoted on said periphery adjacent to said concavity, a cam fixed alongside said element, and operative connection to said finger, bearing on said cam whereby said finger rises against an article in said concavity as said article is received from said chute, and whereby said finger recedes close to said periphery as said concavity passes said chute, means to rotate said element simultaneously with the travel of said wrapping means, means for supplying a wrapper or label between said article and said wrapping means, and means to press said article and said wrapper or label together in said wrapping means during subsequent travel thereof.

PAUL VARGA.

Witnesses:
JAMES N. RAMSEY,
CLARENCE PERDEW.